United States Patent [19]
Reid et al.

[11] Patent Number: 5,001,985
[45] Date of Patent: Mar. 26, 1991

[54] SENSOR SYSTEM

[75] Inventors: John P. Reid; Stephen J. Clarke; David G. Young, all of Bracknell, United Kingdom

[73] Assignee: British Aerospace Public Limited Company, London, England

[21] Appl. No.: 246,143

[22] Filed: Aug. 29, 1988

[51] Int. Cl.$^5$ ............................................. F42B 23/04
[52] U.S. Cl. ..................................... 102/427; 89/41.19
[58] Field of Search ................. 89/41.05, 41.06, 41.19; 102/418, 425, 427

[56] References Cited

U.S. PATENT DOCUMENTS

| | | |
|---|---|---|
| 2,276,270 | 3/1942 | Gregory . |
| 2,473,893 | 6/1949 | Lyle . |
| 2,570,276 | 10/1951 | Reierson . |
| 3,509,791 | 5/1970 | Pechamat et al. . |
| 3,893,368 | 7/1975 | Wales, Jr. . |
| 4,398,466 | 8/1983 | Sepp et al. ............................ 102/427 |
| 4,761,652 | 8/1988 | Pirolli et al. ......................... 102/427 |

FOREIGN PATENT DOCUMENTS

| | | |
|---|---|---|
| 2511738 | 9/1976 | Fed. Rep. of Germany ..... 89/41.06 |
| 3325755 | 1/1985 | Fed. Rep. of Germany ..... 89/41.06 |
| 14100 | 2/1977 | Japan .................................. 89/41.19 |
| 2063430 | 6/1981 | United Kingdom . |
| 1594601 | 8/1981 | United Kingdom . |
| 2070877 | 9/1981 | United Kingdom . |
| 1605228 | 3/1985 | United Kingdom . |
| 2174859 | 11/1986 | United Kingdom . |
| 1605287 | 2/1988 | United Kingdom . |

Primary Examiner—Charles T. Jordan
Assistant Examiner—Stephen Johnson
Attorney, Agent, or Firm—Cushman, Darby & Cushman

[57] ABSTRACT

A sensor system for a weapon, the sensor system comprising at least two light detectors having different fields of view and control means responsive to signals from the light detectors to calculate an appropriate time delay to firing of the weapon and to cause activation of the weapon firing system accordingly.

12 Claims, 2 Drawing Sheets

SENSOR SYSTEM

This invention relates to an sensor system and relates particularly, but not exclusively, to an sensor system for use in a convert weapon comprising a gun, anti-tank weapon or the like.

An object of the present invention is to provide a sensor system for detecting radiation indicative of the presence of a specific type of target, such as a tank.

According to the present invention we provide a sensor system for a weapon, the sensor system comprising at least two light detectors having different fields of view and control means responsive to signals from the light detectors to calculate an appropriate time delay to firing of the weapon and to cause activation of the weapon system accordingly.

For the purposes of this specification, the term "light" shall be taken to apply to radiation in the infra-red, visible and ultra-violet wavebands.

The sensor system may comprise range setting means enabling selection of one range band from a plurality of fixed range bands accordingly to the likely range of the weapon from a target.

Preferably, the sensor system comprises means for approximating the range of a designated type of target. The sensor system may comprise range approximating means which is operable to classify the range of a target as falling within one of a plurality of predetermined bands of ranges. In an embodiment to be described, three predetermined bands of ranges are used i.e. short, medium and long range. Alternatively, several predetermined range bands all below a selected maximum range may be used.

Preferably, the sensor system is adapted so as not to cause activation of the weapon firing system unless a designated type of target is within a preselected range. This range gating feature has the advantage of reducing the chances of producing a nugatory attack in response to an object which is smaller than the predetermined type of target e.g. an animal or a person. The range gating may be achieved by adapting the sensor system so that it causes activation of the weapon firing system only if a target is detected by two of the optical detectors simultaneously. Alternatively, a range gating algorithm may be used utilizing the time taken to cross the field of view of one or both detectors.

Preferably, the sensor system is adapted to cause activation of the weapon firing system only if two or more of the light detectors first sense radiation from a possible target in a predetermined order. This feature reduces the chances of initiation of the fire control system due to random effects such as flames or hot gases appearing within the field of view of the detectors by requiring detection in a predetermined sequence.

Advantageously, the sensor system is adapted to sense targets moving in either direction generally across the fields of view of the light detectors. The sensor system may comprise two sets of two light detectors for sensing oppositely moving targets.

In the embodiment to be described, the light detectors are passive infra-red detectors each operable to detect radiation falling within a preselected wave band.

A particular embodiment of the present invention will now be described, by way of example, with reference to the accompanying drawings in which.

Figure 1:
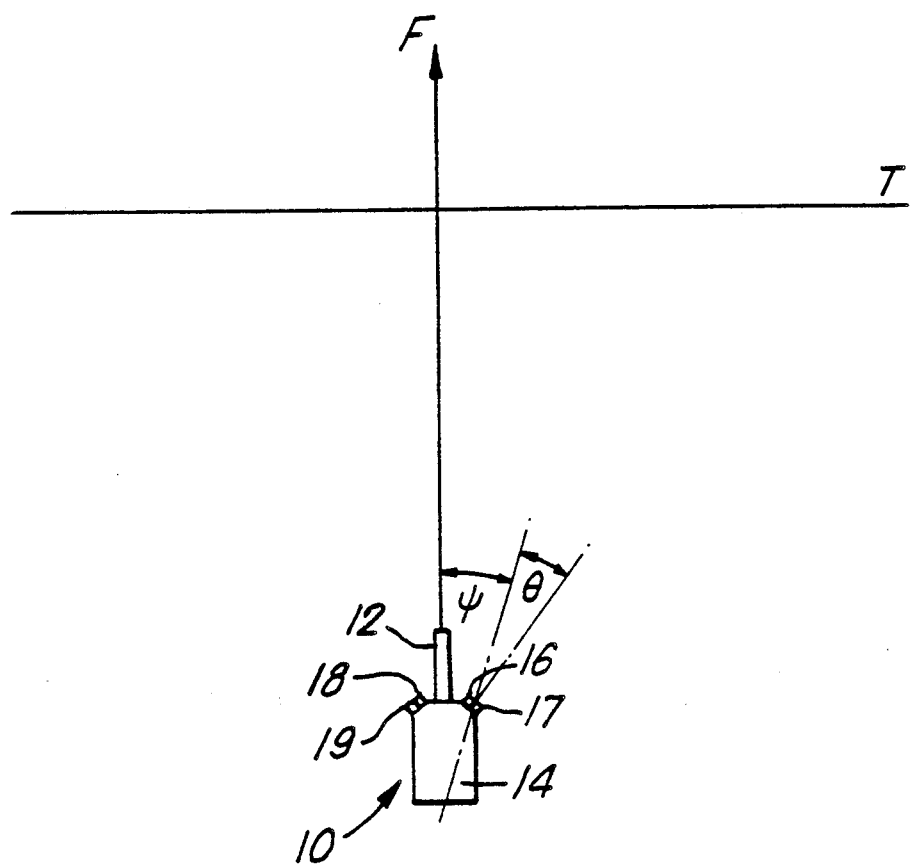
FIG. 1 is a diagram showing the trajectory of an approaching tank with respect to a sensor system according to the present invention.

Referring to FIG. 1, a convert anti-tank mine is indicated generally at 10 and comprises an anti-tank gun 12, a fire control system 14 and four passive infra-red sensor 16 to 19 e.g. pyroelectric detectors. The detectors 16 and 17 are for detecting tanks travelling from right to left and the detectors 18 and 19 are for detecting tanks travelling in the opposite direction. The detectors 16 to 19 are protected from the environment by a suitable window such as polythene which transmits I-R radiation. Incoming I-R radiation may be focussed on the detectors using a concave mirror. The mirror may be so shaped and so located that the detectors do not lie in the field of view of the mirror and therefore do not themselves block any incoming radiation. It will be understood that lenses may also be used for focussing radiation onto the detectors 16 to 19.

In practice, the mine 10 is likely to be hidden in foliage alongside a road and may well be left unattended and running on battery power for relatively long periods e.g. a month or so. The line of fire of the anti-tank gun 12 is indicated by line F and the line of the approach of a tank along a road is indicated by line T. $\theta$ is the angle between the central axes of the fields of view of the detectors 16 and 17. The same angle $\Theta$ is also between central axes of fields of view of detectors 18 and 19. $\psi$ is the lead angle between the central axes of the field of view of the detector 16 and the line of fire F. An angle equal to $\psi$ is also found between line F and the central axis of the field of view of detector 18. The angle $\psi$ is chosen so that it is greater than the aim off angle which would ever be required in practice in view of the top speeds of known tanks.

Figure 2:
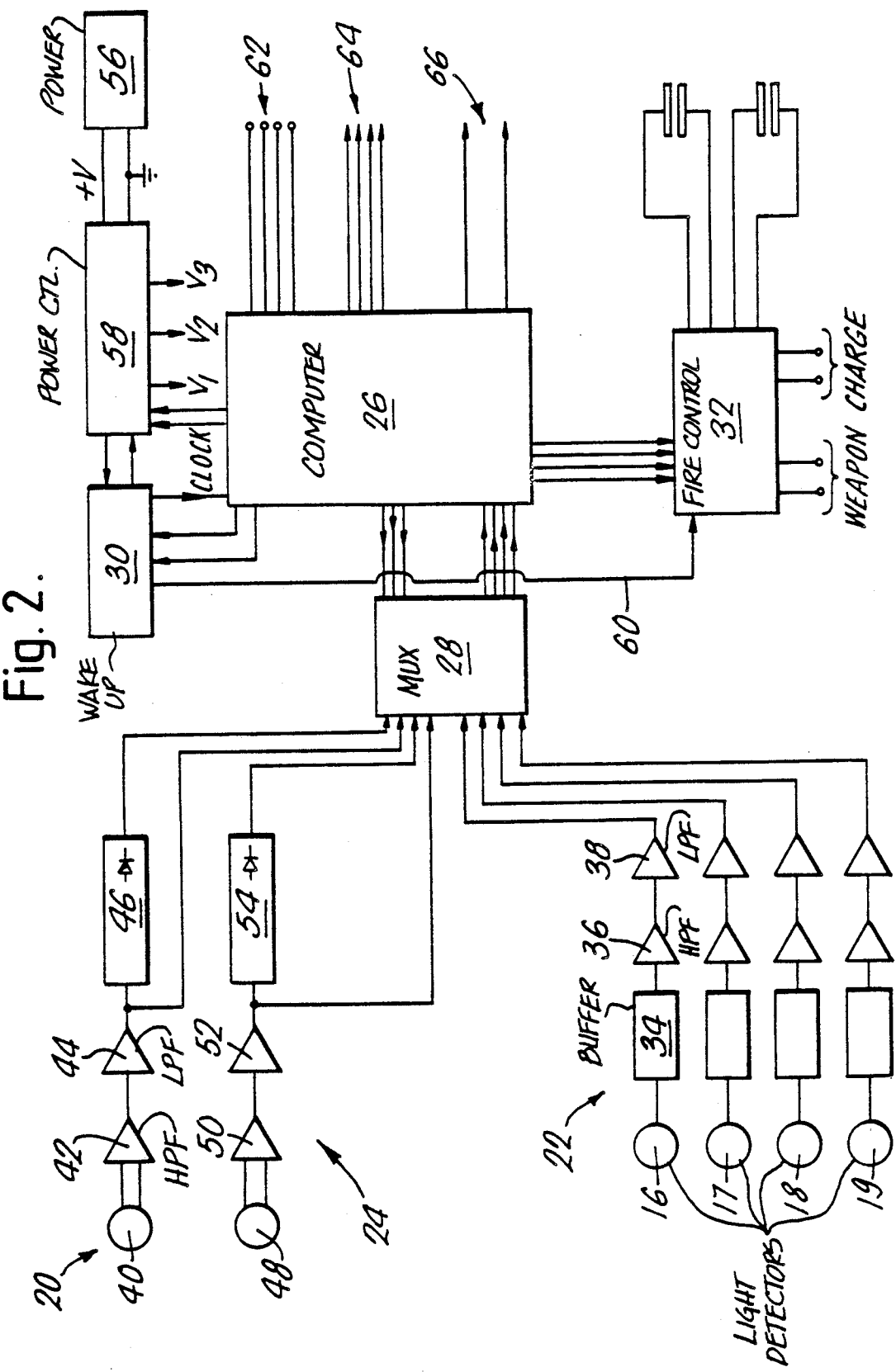
FIG. 2 is a block diagram illustrating the components of a sensor system according to the present invention.

Referring to FIG. 2, a sensor system for a convert anti-tank mine is indicated generally at 20 and comprises a radiation sensor system 22 and an acoustic-seismic sensor system 24 both of which are connected to a computer 26 via a multiplexer 28. Also connected to the computer 26 is a unit 30, the purpose of which is to be described, and a fire control unit 32.

The radiation sensor system 22 comprises the four detectors 16 to 19 shown in FIG. 1. Each of the detectors 16 to 19 is connected to a buffer 34 and to high and low pass filters 36 and 38 respectively.

The acoustic-seismic sensor 24 comprises a microphone 40 which is connected to high and low pass filters 42 and 44 respectively and to a rectification and smoothing unit 46. The input to output of the rectification and smoothing unit 46 are connected to the multiplexer 28. The acoustic-seismic sensor 24 also comprises a geophone 48 which is likewise connected via high and low pass filters 50 and 52 respectively and to a rectification and smoothing unit 54. The rectification and smoothing unit 54 has its input and output connected to the multiplexer 28.

The power source for the sensor system 20 is a battery 56 which is connected to a power control unit 58 which has three outputs labled $V_1$, $V_2$ and $V_3$ in FIG. 2. The power control unit 58 is connected to the unit 30 which is operable to provide a "wake-up" signal to the computer, unit 26. The unit 30 is also operable to send disable signals from the computer 26, the fire control unit 32. In response to signals from the computer 26, the first control unit 32 is operable to fire the weapon or to denote a self destruct charge. The computer 26 controls the outputs from unit 58. These outputs, $V_1$, $V_2$, $V_3$, may be regulated voltages and are used to activate and deactivate different sections of the system. $V_1$ is generally used to control the computer 26 and the acoustic-seismic sensor area, $V_2$, the radiation sensor area and $V_3$, the fire control unit. $V_1$ is generally always on except when the batteries become discharged whereby $V_1$ is removed to reduce the probability of a nugatory firing.

the computer 26 also supplies signals to test connections indicated at 62, to a key pad through connections indicated at 64 and to display means via connections indicated at 66.

In operation, when signals indicative of the approach of a tank are sensed by the microphone 40 or the microphone 40 and the geophone 48, the computer 26 causes the unit 30 to send a "wake-up" signal to the power control unit 58. The computer 26 begins a search sequence in which it continually samples signals from the light detectors 16 to 19 and analyses these to see whether they are indicative of an approaching tank. Assuming a tank is approaching from right to left in FIG. 1, the computer 26 processes the signals deriving from the detectors 16 and 17 to calculate the appropriate time delay before causing the weapon to be fired. The time delay $T_D$ is calculated according to the following equation:

$$T_D = T_\theta \frac{\left(\psi + \frac{L}{R}\right)}{\theta} - \left(T_S + \frac{R}{V_W}\right) \quad (1)$$

Where $\psi$ and $\theta$ are the angles shown in FIG. 1;

R is the range of the tank which is taken to be fixed value e.g. the distance of the middle of the road from the mine 10;

L is the distance from the front edge of the tank to the optimum hit point on the tank;

$T_{74}$ is the time taken for the tank to cross angle $\theta$;

$T_S$ is the time delay which it takes for the infra-red detectors 16 and 18 to register a signal;

$V_W$ is the mean velocity of the projectile.

As an alternative to assuming a single fixed range for the tank, the mine 10 may comprise means for an operator to select one range band from a plurality of fixed range bands according to where the mine is being positioned in relation to the likely target trajectory. For example, there may be six range bands to choose from, the bands getting larger as the range increases.

Optionally, for ranges less than a fixed value, say 100 m, the sensor system may be programmed to operate so that the value of $T_\theta$ determines which one of a particular set of range values will automatically be used in equation (1) e.g.

if $T_\theta < k_1$ use $R_1$
if $k_1 < T_\theta < k_2$ use $R_2$
if $k_2 < T_\theta < k_3$ use $R_3$
if $k_3 < T_\theta < k_4$ use $R_4$
if $k_4 < T_\theta < k_5$ use $R_5$
if $k_5 < T_\theta < k_6$ use $R_6$ where $K_1$ to $K_6$ are time constants and $R_1$ to $R_6$ are range values.

As another alternative to assuming a single fixed range for the tank, the range can be calculated approximately even though the sensor system is a passive one. This is done by assuming a particular tank speed, say 7-8 meters per second, and then using $T_\theta$ to calculate the distance which the tank travelled in crossing angle $\theta$ which gives the range R:

$$d = V \times T_\theta$$

where d=distance to cross angle $\theta$ and V=tank speed.

The sensor system is designed to classify the tank range R as falling within one of three predetermined categories i.e. short, medium and long range and the calculated range can thus be used to refine the fire control calculation according to equation (1) above.

The error (E) in the point of impact relative to the desired point of impact can be calculated as follows:

$$E = \frac{V}{\frac{T}{V_W}}(R' - R) + L\left(1 - \frac{R}{R'}\right) \quad (2)$$

where R' is the estimated range and R is the actual range.

Another possibility when using very fast travelling projectiles e.g. explosively formed projectiles, is to fire a fixed time after the target crosses a designated field of view.

The sensor system according to the present invention is designed only to initiate a firing sequence when a target is viewed simultaneously by an associated pair 16 and 17 or 18 and 19 of the infra-red detectors. This means that the weapon system will not fire at tanks beyond a range determined by the size of angle $\theta$ and will not fire at smaller objects at closer range but which cannot be seen simultaneously by both of the detectors 16 and 17.

A further feature of the sensor system is the requirement for an associated pair 16 and 17 or 18 and 19 of the detectors to sense a target in the proper sequence otherwise no fire command will be given.

It is envisaged that the rate of change of target speed may be calculated if desired by using three or more light detectors.

Optionally, the sensor system 20 may be configured so as to self-destruct after a predetermined period of time.

An optical sensor system as described above may be used in conjunction with an acoustic and or seismic sensor system of the type described in our co-pending British patent application entitled "Signal Averaging Means" and which has the same priority date as the present application.

We claim:

1. A weapon system for being left unattended near where a target vehicle might pass and for firing a projectile at that vehicle, the system comprising:
   a projectile firing weapon having a fixed line of fire;
   target sensor means fixed relative to the weapon and comprising two photo-sensitive detectors aimed at respective predetermined amounts to one side of said line of the fire for detecting said target vehicle approaching from said one side before it crosses said line of fire, said detecting being at respective times dependent on the vehicle speed; and
   control means connected to the sensor means and the weapon and operable to determine a time interval between said respective times dependent on the vehicle speed and to fire the weapon after a time delay calculated by the control means and dependant on the time interval and said predetermined amounts of detector aim off said line of fire so that the projectile fired by the weapon will strike the target vehicle as it crosses said line of fire.

2. A system according to claim 1, wherein the control means calculates the time delay by calculating a result of a mathematical function having a plurality of terms one of which is the time interval and another of which is one of a plurality of different fixed constants available to the control means and representative of respective weapon to target distance ranges.

3. A system according to claim 2, wherein the control means includes range selection means for enabling pre-selection of a particular distance range representative constant used to calculate the time delay.

4. A weapon system according to claim 2, wherein a particular distance range representative constant used by the control means to calculate said time delay is selected by the control means from among said plurality of such constants in dependance upon said time interval.

5. A system according to claim 4, wherein the control means is operable to compare the time interval with a series of reference thresholds and, in dependance upon that comparison, for selecting one of the distance range representative constants to use in calculating the time delay.

6. A system according to claim 1, wherein the control means is operable to determine whether there is any overlap of respective time periods over which said detectors receive target-omitted radiation and to fire said weapon only if there is such overlap.

7. A system according to claim 1, wherein the control means is operable to determine the respective times at which and the order in which the detectors detect the vehicle and to fire the weapon only if the detectors detect the vehicle consecutively in a predetermined order.

8. A system according to claim 1, wherein the sensor means further comprises two further photo-sensitive detectors aimed off to the other side of the line of fire for detecting a vehicle approaching from that other side.

9. A system as in claim 1, wherein said control means includes means for entering a reduced power loading state, and further comprising means for providing a wake-up signal to said control means based on a predetermined stimulus.

10. A system as in claim 9, wherein said predetermined stimulus is a detection of a sound.

11. A system as in claim 10, further comprising:
means for detecting a low battery, and for disabling said control means based on said detection.

12. An off-route mine having as its target a passing tank or like armored vehicle, the mine comprising:
an anti-armor projectile firing weapon adapted for being left unattended with a fixed line of fire crossing likely routes along which said target might pass;
sensor means fixed to the weapon and comprising first and second pairs of photo-sensitive detectors aimed off to respective sides of said line of fire for detecting a target approaching from those sides, the detectors of each pair being aimed off through respective different fixed aim-off angles to detect the target at respective different times separated by a time interval dependent on a weapon to target route distance and a target speed; and
control means, connected to the sensor means and the weapon, for sensing when the detectors of either pair produce target indicative signals in a predetermined order over time periods which overlap but are not simultaneous, and for calculating a time delay as a function of said time interval, said aim-off angles and a selected one of a plurality of constant values which are available to the control means and which are representative of respective weapon to target route distance ranges and then firing said weapon after said time delay and after said sensing.

* * * * *